(12) United States Patent
Bernhardt et al.

(10) Patent No.: US 9,164,161 B2
(45) Date of Patent: Oct. 20, 2015

(54) AUGMENTING LOCATION DATA AT A MOBILE DEVICE

(71) Applicant: Research In Motion Limited, Waterloo (CA)

(72) Inventors: Bruce Allen Bernhardt, Wauconda, IL (US); Jingwei Xu, Buffalo Grove, IL (US); I-Ming Tsai, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 299 days.

(21) Appl. No.: 13/758,558

(22) Filed: Feb. 4, 2013

(65) Prior Publication Data

US 2014/0218241 A1 Aug. 7, 2014

(51) Int. Cl.
*G01S 5/02* (2010.01)

(52) U.S. Cl.
CPC .................................. *G01S 5/0236* (2013.01)

(58) Field of Classification Search
CPC ....... G01S 5/0236; G01S 5/0054; H04W 4/02; H04W 64/00
USPC ........................................... 455/456.1–456.6
See application file for complete search history.

(56) References Cited

U.S. PATENT DOCUMENTS

| | | | |
|---|---|---|---|
| 7,574,606 B1 * | 8/2009 | Fan et al. ....................... 713/179 |
| 7,688,260 B2 * | 3/2010 | Pomerantz et al. ...... 342/357.43 |
| 7,970,415 B2 * | 6/2011 | Mikan et al. ................ 455/456.2 |
| 8,743,699 B1 * | 6/2014 | Finlow-Bates et al. ........ 370/241 |
| 2007/0135135 A1 * | 6/2007 | Brown ........................ 455/456.1 |
| 2008/0176583 A1 | 7/2008 | Brachet et al. |
| 2009/0088183 A1 * | 4/2009 | Piersol et al. .............. 455/456.1 |
| 2009/0280775 A1 * | 11/2009 | Moeglein et al. ............. 455/410 |
| 2011/0039578 A1 * | 2/2011 | Rowitch et al. ............ 455/456.1 |
| 2012/0028649 A1 | 2/2012 | Gupta et al. |
| 2013/0012232 A1 * | 1/2013 | Titus et al. ................. 455/456.2 |

OTHER PUBLICATIONS

European Patent Office,"The Extended European Search Report" issued in European Patent application No. 13153792.0, dated Apr. 9, 2013, 6 pages.

* cited by examiner

*Primary Examiner* — Brandon Miller
(74) *Attorney, Agent, or Firm* — Jon Gibbons; Fleit Gibbons Gutman Bongini & Bianco P.L.

(57) ABSTRACT

Mobile devices are able to determine their location based radio transmitters that are visible at the device to provide geographic location services. A knowledge of the location of the transmitters is required for the mobile device to determine a location estimate, however this can be difficult in network environments where the transmitters are temporary and their locations are not identified in location databases. Locations of temporary transmitters can be provided to mobile devices in order to augment the available location data used in determining the mobile device location. $3^{rd}$ parties can provide temporal location data on transmitters that are set up for short period of time, as well as better control the distribution of the location data.

22 Claims, 10 Drawing Sheets

300

(Prior Art)

AUGMENTING LOCATION DATA AT A MOBILE DEVICE

TECHNICAL FIELD

The current description relates to geographic location data at a mobile device, and in particular to augmenting location data with temporary location data.

BACKGROUND

Mobile electronic devices may include functionality for determining a geographic location of the device. The location may be determined using various different techniques. For example, a mobile device may use satellite based positioning system such as a Global Positioning System (GPS) that determines the position based on received signals from a number of satellites, an assisted-GPS (A-GPS) system which uses a combination of GPS and wireless network transmitter infrastructure information to determine a location, a network-only based location system using network transmitter locations to determine a location, or a handset-based system where the mobile device may have knowledge of transmitter locations and can provide a location estimate but may utilize location databases retrievable from a network. While some location techniques may work well in outdoor environments, they require reception of a signal or signals from a satellite, which may be difficult in various locations or conditions such as indoor applications. In addition, location databases used by location services, either network or mobile device based, may not have accurate network information to be able to determine a location in a changing wireless environment and where network or satellite based location services are not available or do not provide sufficient resolution.

Figure 1:
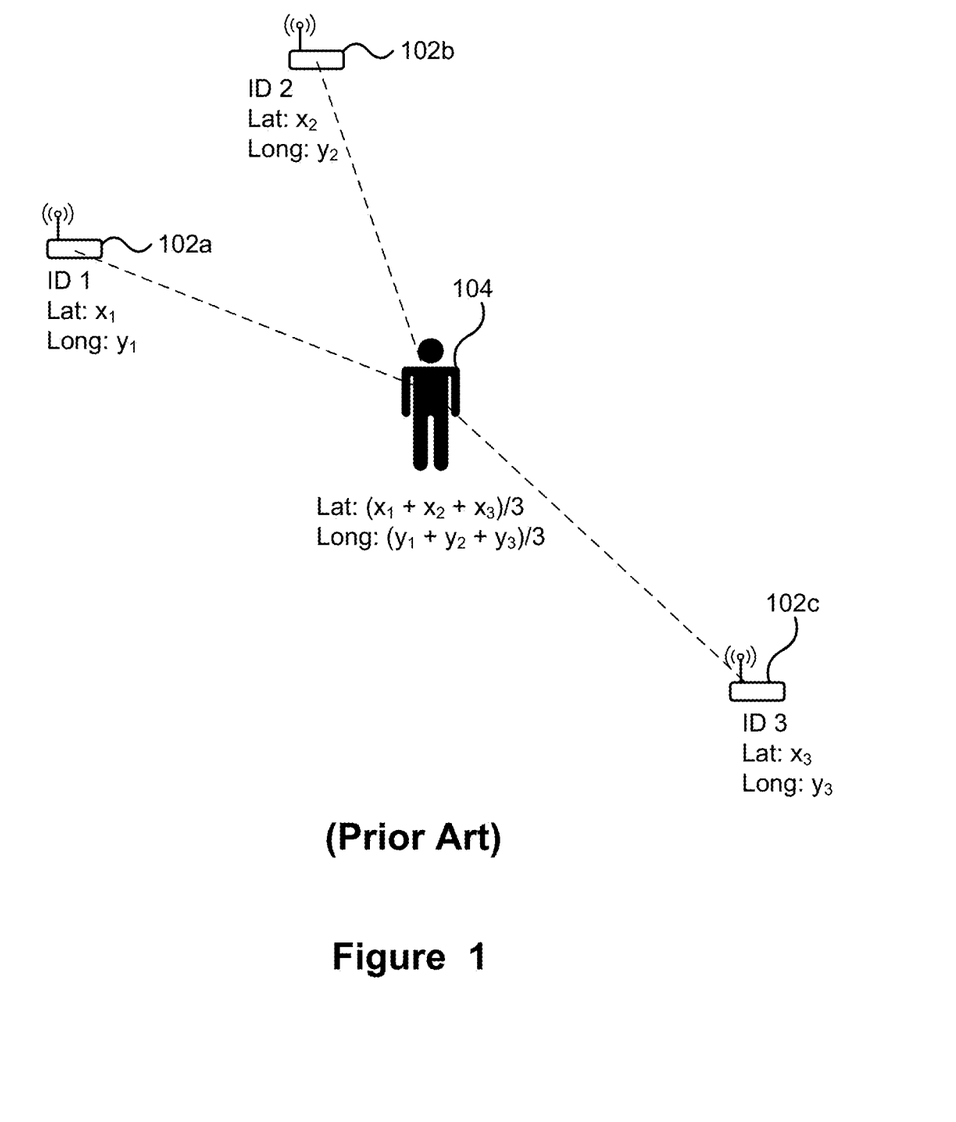
FIG. 1 depicts determining a location of a mobile device using transmitter locations.

FIG. 1 depicts determining the location of the mobile device using transmitter locations. As depicted, a number of Wi-Fi routers 102a, 102b, 102c (referred to collectively as routers 102) transmit RF signals, which are received by a user's mobile device, depicted as user 104. If the location of the routers 102 is known, it is possible to estimate the user's location based on the known router locations. In this example the user's location is depicted as being estimated as a simple centroid of the router locations. It is possible to incorporate the received signal strength, or other means of estimating a distance from a receiver such as time pulse, from the different routers 102 in order to improve the accuracy of the estimated location. Further, although described as being Wi-Fi routers, the same technique may use different transmitters such as cellular transmitters and Bluetooth transmitters or similar devices from which the strength or the pulse of an RF signal may be measured.

As described above, it is possible to estimate a user's location, or more particularly a user's mobile computing device, using the locations of transmitters. However, these techniques require that the locations of transmitters be available to the mobile device. It is possible to maintain a list of transmitters that were observed by user devices and their location when the observations were made. Although this technique can provide the locations for transmitters, it has a relatively large latency from when transmitters are first observed and their locations are propagated to location databases and then to mobile devices.

As such, it is difficult to determine a mobile device's location using the locations of transmitters whose geographical locations change periodically. For example, during a conference a hotel or conference organizer may setup a number of temporary Wi-Fi transmitters to provide capacity to service a temporary capacity influx. Although the conference organizer or hotel may know the locations of the temporary transmitters, the transmitter locations typically would not propagate into a location database used by the mobile device quickly enough to be of use to help location services. That is, by the time the location data for the conference transmitters is available in the location database, the conference may be completed. In addition, the temporary transmitters may have been previously used at another location which can provide incorrect location data if propagated to the location database.

It is desirable to have an additional or alternative method for determining a mobile devices' location using temporary location data of transmitters.

BRIEF DESCRIPTION OF THE DRAWINGS

Various embodiments are described with reference to the figures, in which.

DETAILED DESCRIPTION

In accordance with the current description there is provided a method of augmenting location data at a mobile device. The method comprises determining that 3rd party temporal location data providing physical locations associated with a plurality of communication transmitters is available at a network location; and augmenting location data used by a location service of the mobile device with the 3rd party temporal location data available at the network location for use in determining an estimate of a position of the mobile device that detects one or more of the plurality of communication transmitters.

In accordance with the current description there is further provided a mobile device capable of augmenting location data at the mobile device, the mobile device comprises a processor for executing instructions; and a memory for storing instructions, which when executed by the processor configure the mobile device to perform a method of augmenting location data at a mobile device. The method comprises determining that 3rd party temporal location data providing physical locations associated with a plurality of communication transmitters is available at a network location; and augmenting location data used by a location service of the mobile device with the 3rd party temporal location data available at the network location for use in determining an estimate of a position of the mobile device that detects one or more of the plurality of communication transmitters.

Determining a user's location, or more particularly a location of a user's mobile device, can be accomplished using various techniques. For example, the mobile device may be able to determine its location using a Global Positioning System (GPS) and if GPS is unavailable, or too inaccurate, the mobile device may attempt to determine its location using locations of visible communication transmitters. The communication transmitters may be for example, cellular transceivers, Wi-Fi™ (Institute of Electrical and Electronic Engineers (IEEE) 802.11 standards) transceivers or other communication transceivers or base-stations. The location data associated with the communication transceivers is typically not readily available. For cellular networks, the network provider may keep the location data of their transceivers private in order to monetize the data for use with their own applications. For Wi-Fi transceivers, there is no infrastructure in place to allow an owner or operator of the Wi-Fi transceivers to specify the locations. As such, the location data of transceivers, whether cellular transceivers or Wi-Fi transceivers have typically been estimated through observations made at a plurality of mobile devices. For example, a mobile device that is capable of determining its location, for example using GPS, may report a radio scene indicating visible communication transceivers and the associated location. The radio scene may include additional information such as signal strength and/or timing information. From radio scenes tagged with location data reported by a number of mobile devices, it is possible to estimate locations of communication transceivers. As such, a database of locations of communication transceivers can be built. However, using such a process for estimating locations of transceivers, there is a delay between when a transceiver may first be observed by a mobile device and when the transceiver's estimated location can be used by other mobile devices. This latency makes determining transceiver locations difficult for transceivers that may be periodically repositioned or recently populated or removed from service.

Communication transceivers may be repositioned in order to accommodate changing network requirements. For example, during a conference at a hotel, additional communication transceivers may be setup in order to support the increased network demand for the conference. These additional communication transceivers may only be in the location for a short period of time, such as a few days or a week. As such, techniques for estimating the transceiver locations based on reports from mobile devices, which may require more time to estimate the locations then the transceivers will be in the location for, may not be useful. However, having the location data available for use by conference attendees is desirable, as it can be used by mobile devices to determine their positions within the conference venue. Typically, GPS reception is poor indoors and as such determining a user's indoor position using the locations of communication transceivers may improve location based services. For example, the location data could be used to provide a map of the conference venue and provide directions to the attendee from their current location to their next meeting location. As described further, a mobile device may receive augmented location data providing positions of the communication transmitters for use in determining the device's location.

Figure 2:
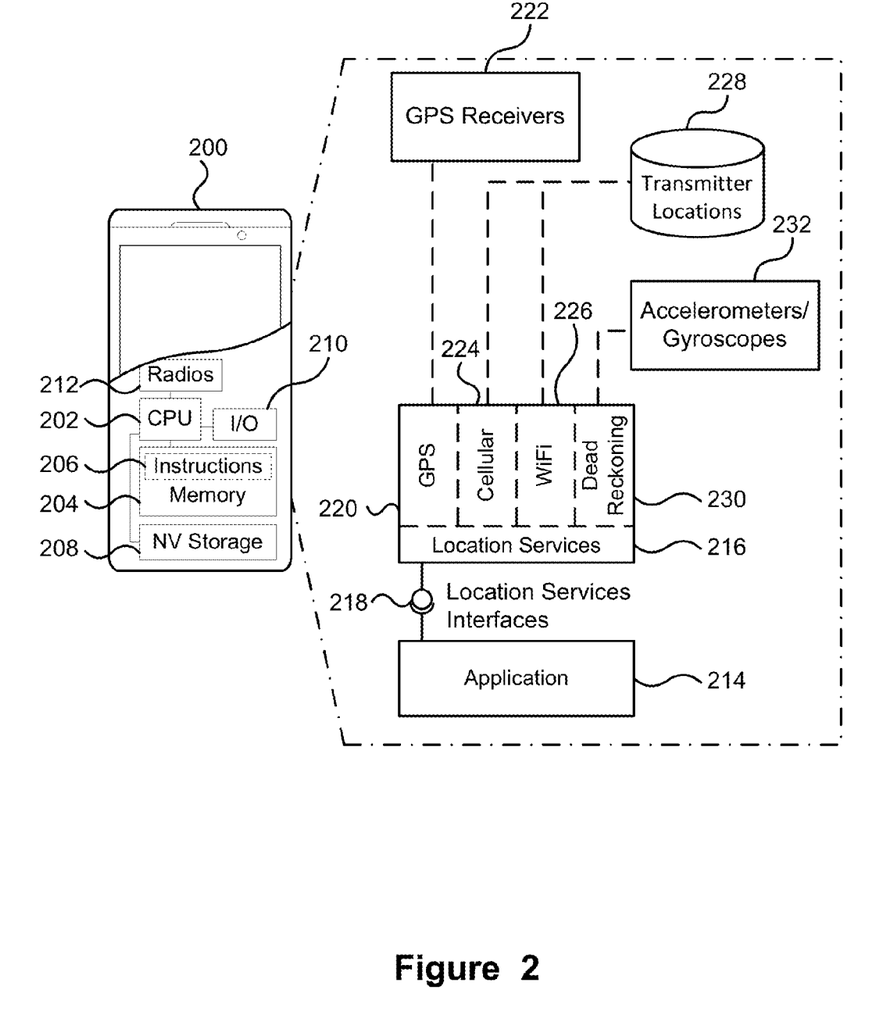
FIG. 2 depicts a mobile device for determining a location with augmented location data.

FIG. 2 depicts a mobile device for determining a location with augmented location data. The mobile device 200 is depicted as a smartphone; however, other mobile devices that can determine their position based on locations of communication transmitters may be used. The mobile device 200 comprises a processor 202 and memory 204 that can store instructions 206 for execution by the processor 202. The mobile device 200 may further comprise non-volatile storage 208 for storing instructions, data and/or other information. The mobile device 200 may further comprise one or more input and/or output (I/O) devices or interfaces 210. An I/O interface allows additional I/O devices, such as accelerometers and/or gyrometers 232 and/or magnetometers, to be connected to the mobile device 200. The mobile device further comprises one or more radios or receivers 212. The radios may include, for example, cellular radios, Wi-Fi radios, WiMax radios, Bluetooth radios or other communication radios. The receivers may include, for example, GPS radio receivers 222, FM or AM radio receivers.

The instructions 206 when executed by the processor 202 configure the mobile device 200 to provide various functionality. The instructions may provide an application 214, such as a web browser, mapping application or other application. The instructions may also provide functionality for location services 216 that determine the mobile device's 200 position and provide it to other components, including application 214. The location services 216 may be interacted with using location services interfaces 218. The location services may be able to determine the location using one or more different location techniques. For example, the location services 216 may include GPS functionality 220 that can determine the mobile device's position based on satellite signals that are received from a GPS receiver 222. The accuracy of the location determined by the GPS functionality 220 may depend upon the signals received. As such, GPS locations are generally not accurate indoors. The location services 216 may include cellular functionality 226 and Wi-Fi functionality 224. Although depicted separately, the cellular and Wi-Fi functionality may be integrated into the same functionality. Both the cellular functionality 224 and the Wi-Fi functionality 226 can estimate the location of the mobile device 200 using known locations of cellular or Wi-Fi transmitters detected at the mobile device 200. The location data used by the cellular functionality 224 and Wi-Fi functionality 226 may be stored on the mobile device 228 as depicted, or may be retrieved from a network location. The location services 216 may further include dead reckoning functionality 230 that determines the current location of the mobile device 200 based on a previous known location and the distance and direction travelled since the last known position. The distance and direction travelled may be determined from accelerometers and/or gyrometers of the mobile device 200.

The location services 216 may provide an interface 218 that allows the application to request a current position of the mobile device 200. The location service may attempt to determine the location using one or more of the possible locating techniques. The locating services 216 may attempt all available techniques and return the most accurate result, or combine the results to provide an improved location. The locating service 216 may also allow the locating functionality to be used in determining the mobile device's 200 location to be specified or set, for example as a user preference. Regardless of how the location is determined, the application 214 can interact with the location services 216 in order to determine a current position of the mobile device.

As described further, when determining the location of the mobile device 200 using the known locations of communication towers the location services, or other component, may receive information from a network location that augments the transmitter location data with temporal location data on the position of temporary communication transmitters. The temporal location data may include an indication of how long the information is valid for, for example a day, a week or other length of time. The ability to augment the location data with temporal location data allows $3^{rd}$ parties to provide location data to mobile devices in order to improve the location determination of the mobile services.

Figure 3:
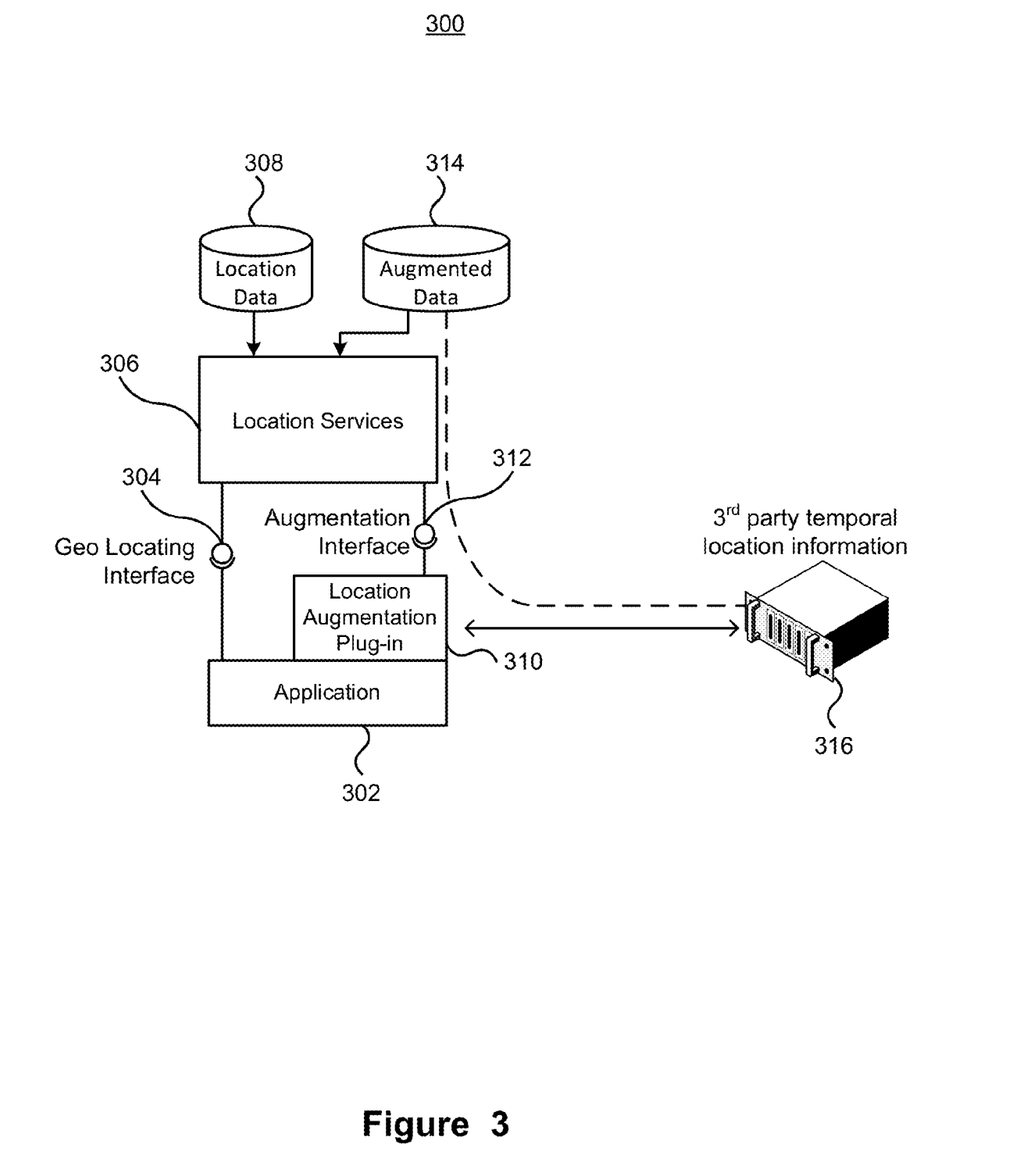
FIG. 3 depicts components for augmenting location data at a mobile device.

FIG. 3 depicts components for augmenting location data at a mobile device. An application 302, such as a browser, may use a locating interface 304 of a location service of the mobile device. The locating interface 304 allows the application 302 to interact with the location services 306 of the mobile device in order to request a location of the mobile device. The location services may attempt to determine the mobile's location in various ways, including using the locations of communication transmitters that are visible by the mobile device. The location data 308 of communication transmitters may be provided by a service or feature that determines location data based on reports from users. In order to augment the location data 308 with 3$^{rd}$ party temporal location data from a network location, the application 302 may include a location augmentation plug-in 310, or alternatively, the functionality may be provided separately from the application or included in the application. The location augmentation plug-in 310 may cooperate with the location services through an augmentation interface 312 as depicted in order to augment the location data available on the mobile device to include the 3$^{rd}$ party temporal location data. Alternatively, the location augmentation functionality may augment the location data directly. Regardless of how the location data is augmented, the location augmentation plug-in functionality allows for the retrieval of the 3$^{rd}$ party temporal location data from a network location 316 and for making the retrieved 3$^{rd}$ party temporal location data available for use by the location services 306.

Figure 8:
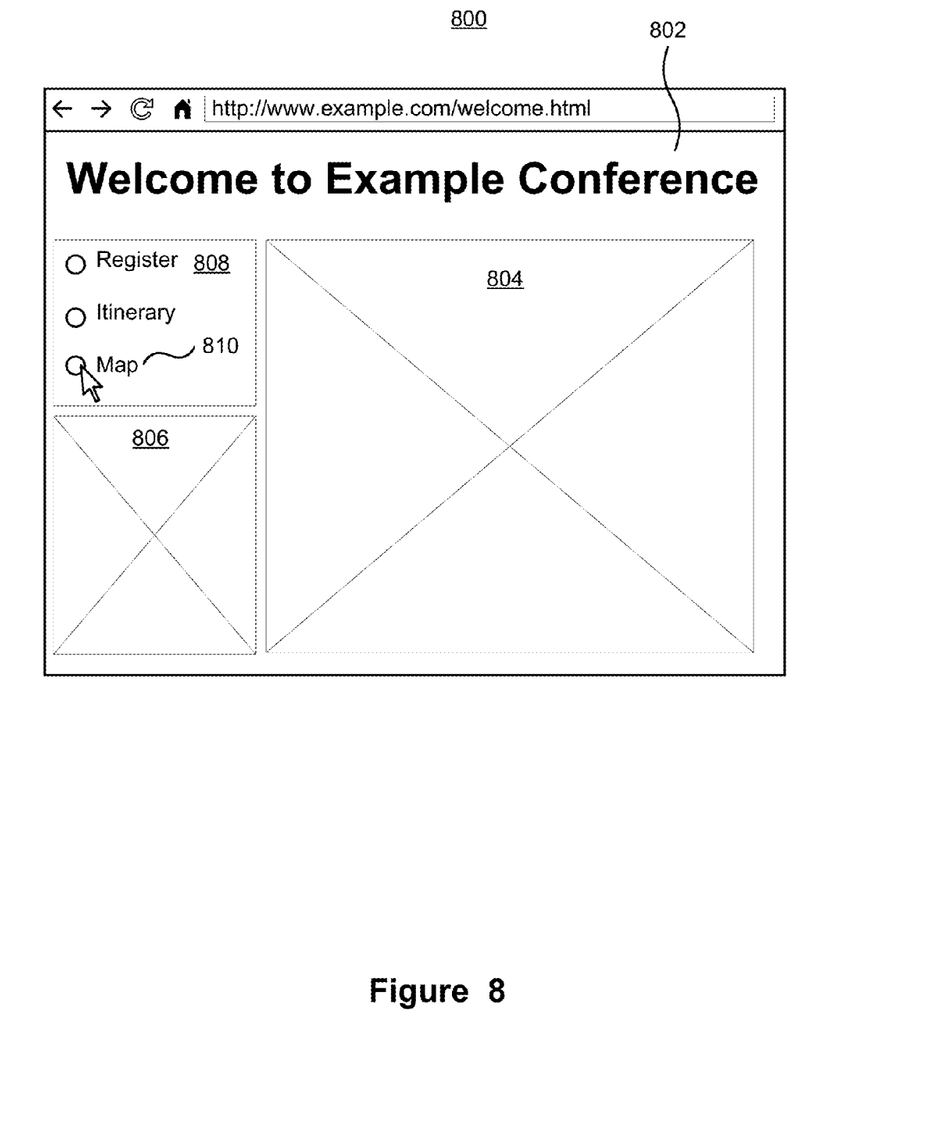
FIGS. 8 to 10 depict illustrative user interface screens for augmenting and using location data at a mobile device.
Figure 9:
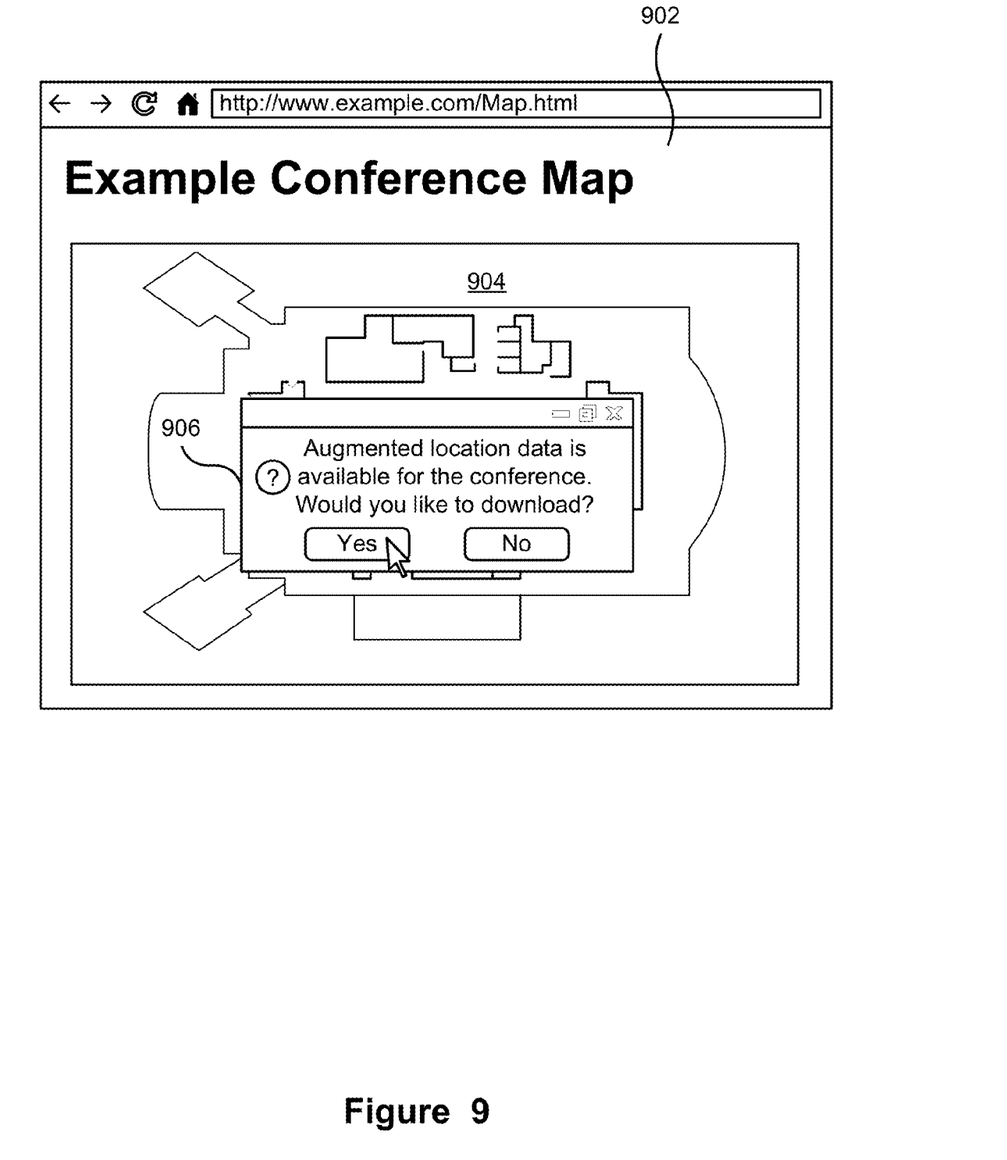
Figure 10:
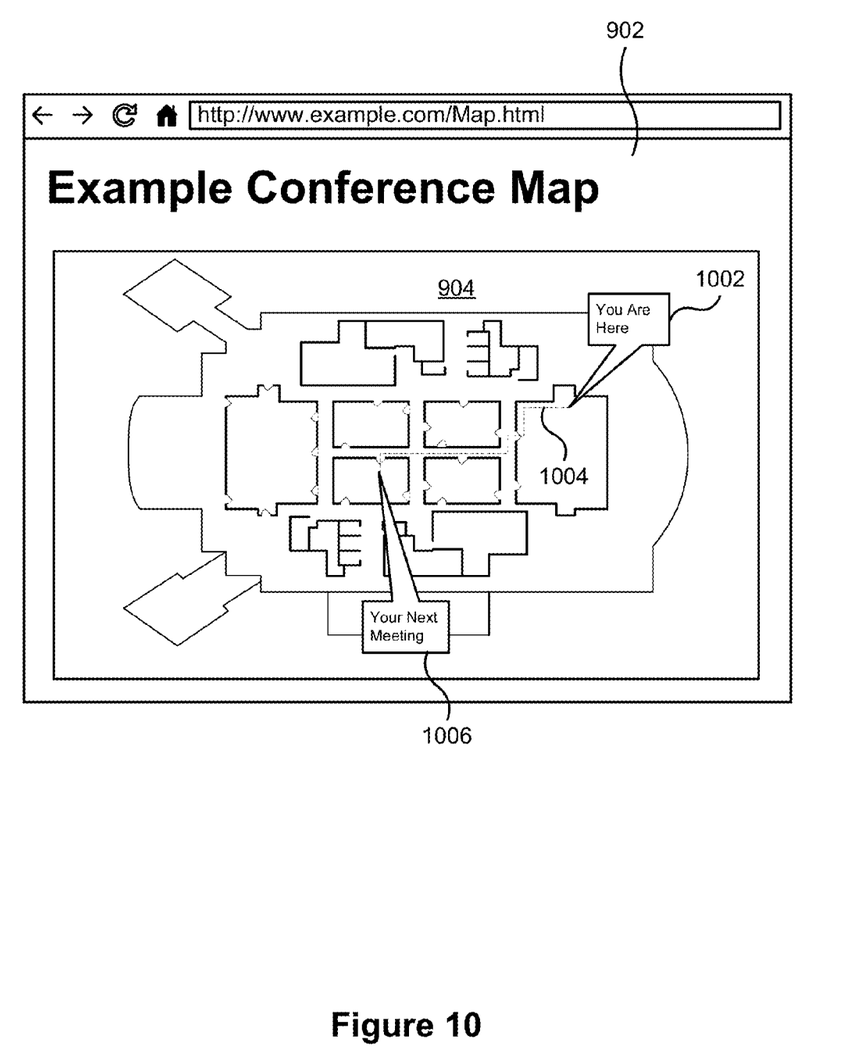

As described further with reference to FIGS. 8 to 10, the application 302 may be a browser. A user may navigate to a web page that requires the user's location, such as a map. The web page may indicate, for example in a CDATA or other tag, that 3$^{rd}$ party location data is available, as well as specifying where the information may be retrieved from. The CDATA information may be processed by the augmentation plug-in in order to augment the location data on the mobile device with the 3$^{rd}$ party location data. The location services may use the augmented location data in order to determine the location of the mobile device, which may then be provided back to the web browser where the web page can display, or otherwise use the location data.

Figure 4:
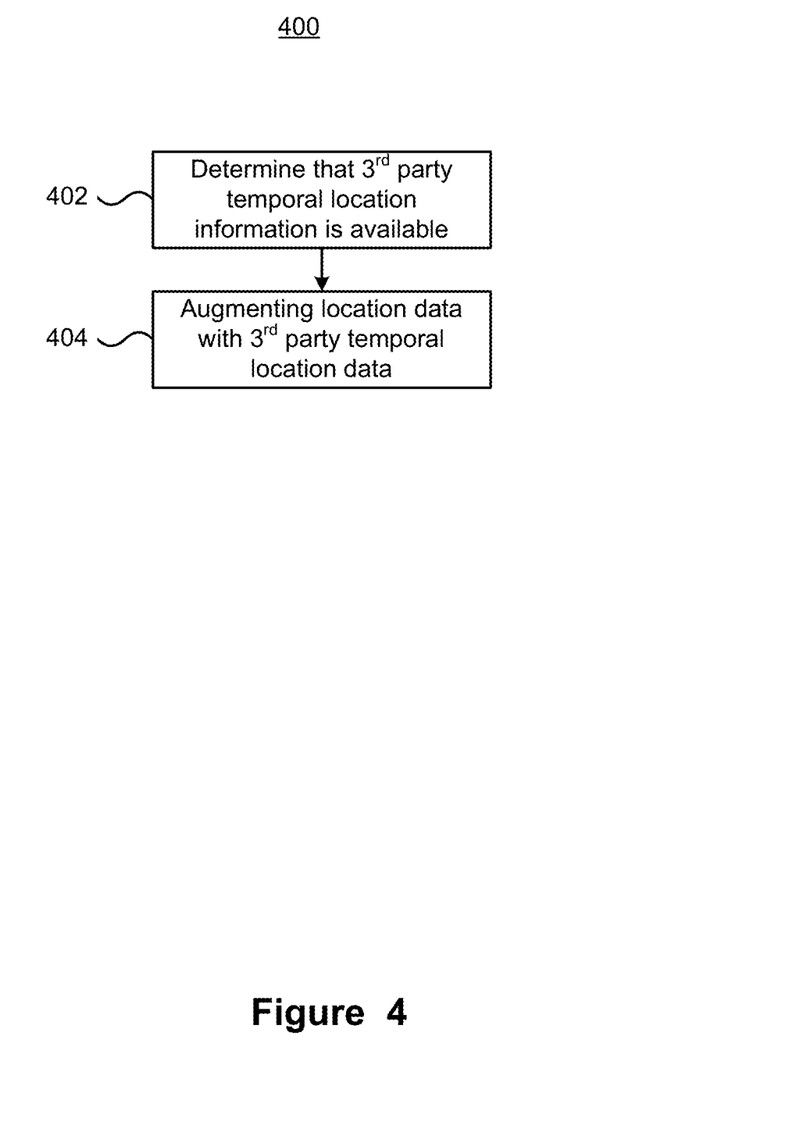
FIG. 4 depicts a method for augmenting location data at a mobile device.

FIG. 4 depicts a method for augmenting location data at a mobile device. The method 400 begins with determining that 3$^{rd}$ party temporal location data is available (402). The determination may be made in various ways. For example, a web page of the 3$^{rd}$ party may invoke the plug-in with appropriate information for locating and retrieving or otherwise accessing the 3$^{rd}$ party temporal location data. Additionally or alternatively, the mobile device may receive an indication from the application that 3$^{rd}$ party location data is available. Further still, the indication may be received through other communication channels including, for example email or social networking applications. It is contemplated that the indication may comprise the 3$^{rd}$ party location data itself. Once it is determined that there is 3$^{rd}$ party temporal data available, it is used to augment the location data available to the mobile device (404). The 3$^{rd}$ party temporal location data may be retrieved from the network location and stored on the mobile device. The 3$^{rd}$ party temporal location data may be stored with the existing location data on the mobile device, or separate from the existing location data. Further, it is possible for the location data to be stored at a remote network location and accessed by the mobile device. The mobile device may query the network location for the 3$^{rd}$ party temporal location data associated with an individual transmitter ID or the mobile device may query the network location to provide an estimate of the position of the mobile device based on a radio scene visible from the mobile device. The radio scene may comprise a list of the transmitter IDs that are visible from the mobile device, or a fingerprint generated based on the transmitter IDs that are visible from the mobile device. The radio scene or fingerprint may also include information on received signal strength, signal timing as well as other characteristics. Regardless of if the existing location data is augmented by retrieving and storing the 3$^{rd}$ party temporal location data at the mobile device, or if the 3$^{rd}$ party temporal location data is stored and accessed through a network location, the mobile device can make use of the available 3$^{rd}$ party temporal location data when determining its location.

Figure 5:
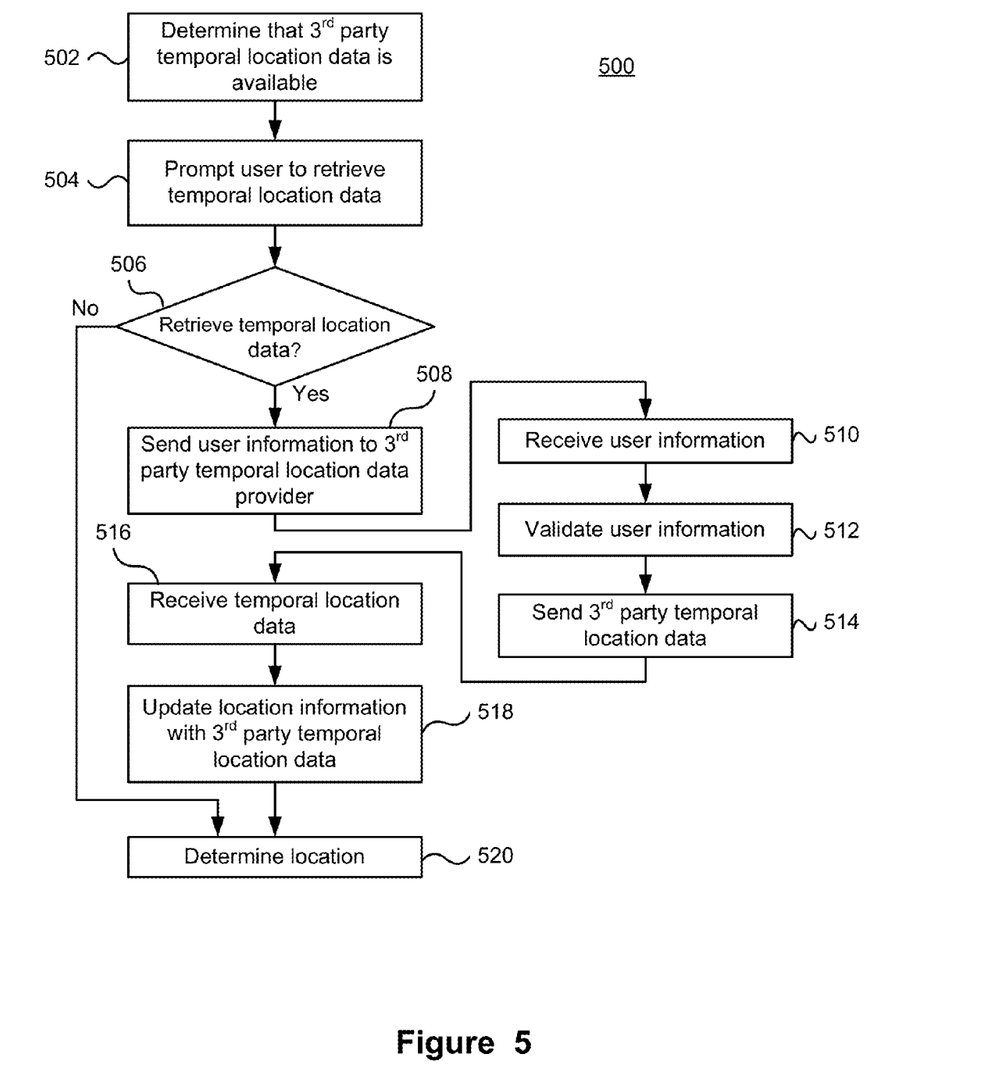
FIG. 5 depicts a further method for augmenting location data at a mobile device.

FIG. 5 depicts a further method for augmenting location data at a mobile device. The method 500 is similar to the method 400 in that 3$^{rd}$ party temporal location data can be retrieved by a mobile device; however, the method 500 further provides for user validation to validate whether or not the user attempting to retrieve the temporal location data is authorized to do so. For example, in the case of a conference described above, the user may be validated to ensure that they have registered with the conference and as such should be provided with access to the 3$^{rd}$ party temporal location data. The method 500 begins with determining that 3$^{rd}$ party temporal location data is available (502). As described above, this determination may be made in various ways. Regardless of the specific mechanism used to inform the user, or the mobile device, that there is 3$^{rd}$ party temporal location data available, once it is determined that the data is available, the user may be prompted to retrieve the 3$^{rd}$ party temporal location data (504). Although it is not necessary to prompt the user as to whether or not the 3$^{rd}$ party temporal location data should be downloaded, it may be considered a security precaution to do so as personal information, such as user name and password may be required to be transmitted. Once the user is prompted, it is determined if the user wants to retrieve the 3$^{rd}$ party temporal location data or not (506). If the user does not wish to retrieve the 3$^{rd}$ party temporal location data (No at 506) the method may proceed to attempt to determine the location of the mobile device using the non-augmented location data, which may result in a poor location estimate. If the user chooses to retrieve the 3$^{rd}$ party temporal location data (Yes at 506), user information, such as a user name and password or some other type of validation information, is sent to the 3$^{rd}$ party temporal location data provider (508). The user information is received (510) at a network location that distributes the 3$^{rd}$ party temporal location data. The network location validates the user information (512) in order to ensure that the user requesting the 3$^{rd}$ party temporal location data is authorized to retrieve the information. Once the user is validated, the 3$^{rd}$ party temporal location data can be sent to the mobile device (514). The mobile device receives the 3$^{rd}$ party temporal location data (516) and augments the location data with the 3$^{rd}$ party temporal location data (518) so that the new location data can be used when determining the user's location. The user's location may then be determined (520) using the augmented data.

Although the above has described the mobile device as downloading the 3$^{rd}$ party temporal location data, it is also contemplated that the 3$^{rd}$ party temporal location data may not be retrieved by the mobile device. Rather, the mobile device may retrieve information that provides information for retrieving or using the 3$^{rd}$ party temporal location data. For example, information retrieved by the mobile device may indicate the network location of a network service that can provide an estimate of the location of the mobile device using the 3$^{rd}$ party temporal location data. In such a scenario, the location service on the mobile device may send to the indicated network service information on the communication transmitters that are visible from the mobile device, possibly along with the strength of the signal received from the respective communication transmitters and receive an estimated location in return. Whether the mobile device retrieves $3^{rd}$ party temporal location data to determine a location estimate, or if the mobile retrieves information on a network service that uses the $3^{rd}$ party temporal location data to provide a location estimate to the mobile device, the mobile device retrieves $3^{rd}$ party temporal location information that allows the mobile device to determine a location estimate using $3^{rd}$ party temporal location data.

Figure 6:
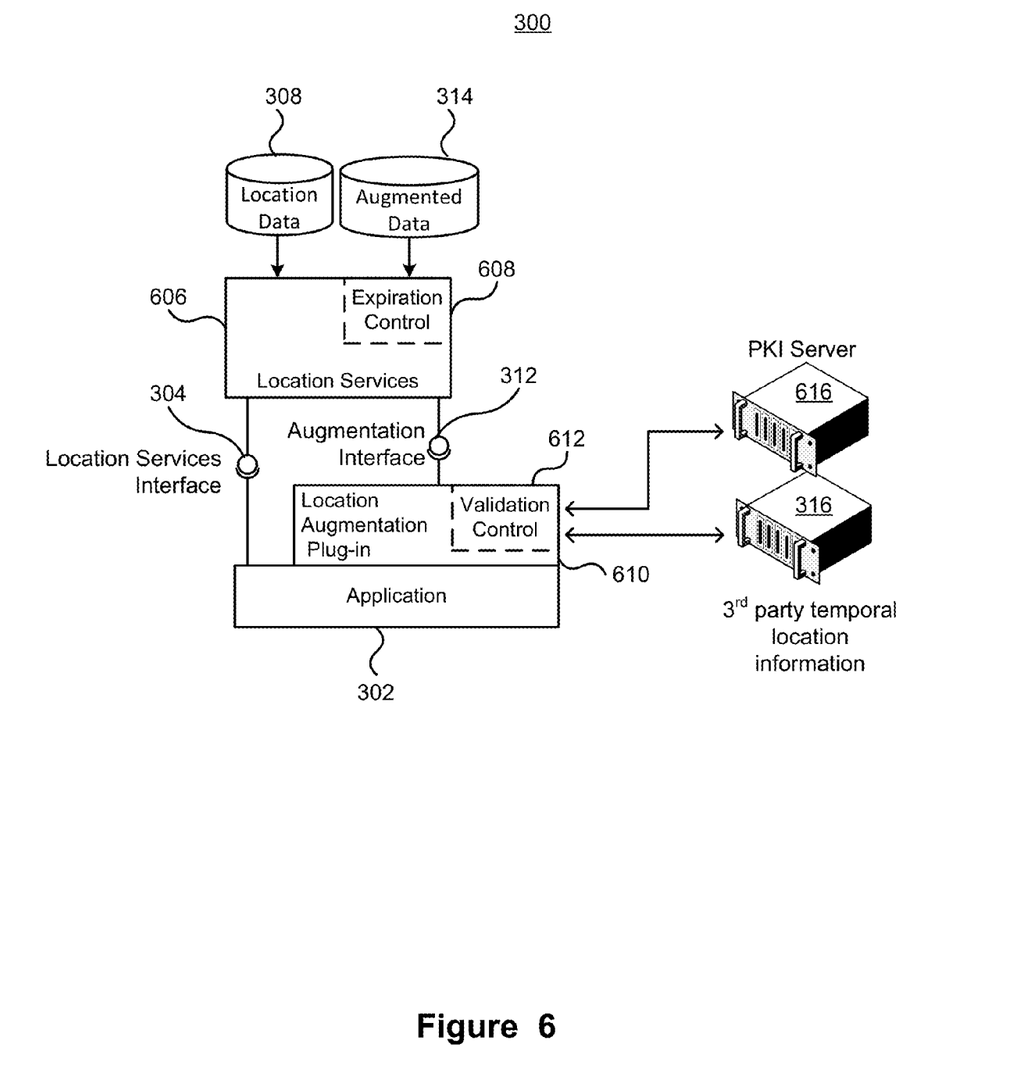
FIG. 6 depicts further components for augmenting location data at a mobile device.

FIG. 6 depicts further components for augmenting location data at a mobile device. Certain components depicted in FIG. 6 are similar to those described above with regard to FIG. 3. As such, similar components are not described again. In contrast to the components described above in FIG. 3, the components of FIG. 6 allow the retrieved $3^{rd}$ party temporal location data to be checked to ensure that the information is secure, that is, the received information is the same as provided by the $3^{rd}$ party. The components further allow an expiration time to be specified, after which the $3^{rd}$ party temporal location data may be removed from the mobile device.

The application 302 interacts with a location augmentation plug-in 610. The location augmentation plug-in 610 can determine when $3^{rd}$ party temporal location data is available and retrieve it from a network location 316 that provides the $3^{rd}$ party temporal location data. In order to ensure that the retrieved $3^{rd}$ party information is secure, and so has not been tampered with, the $3^{rd}$ party information may be validated. The location augmentation plug-in 610 may include a validation control component 612 that can validate that the retrieved $3^{rd}$ party temporal location data was provided by the $3^{rd}$ party. The location augmentation plug-in 610 may provide information, for example from a CDATA tag of a web page, that specifies the location of a server, depicted as PKI server 616, that can provide validation information. The validation control component 612 receives the validation information and validates that the retrieved $3^{rd}$ party temporal location data was provided by the $3^{rd}$ party. If the $3^{rd}$ party temporal location data is not validated, it may be removed from the mobile device. If the $3^{rd}$ party temporal location data is validated, it can be used to augment the location data used by the location services 606. In addition to validating that the $3^{rd}$ party temporal location data was received securely, the validation control component 612 may provide further functionality for ensuring that the $3^{rd}$ party, or network location the $3^{rd}$ party temporal location data was received from, is a trusted or known source.

In addition to ensuring that the received $3^{rd}$ party temporal location data is secure, the validation control component 612 may additionally provide functionality that validates a perimeter of the $3^{rd}$ party temporal location data. The perimeter validation of the location data may provide a sanity check on the location data. For example, if the retrieved $3^{rd}$ party location data is for a location in California, it would not make sense that the location data include a location in New York. Additionally or alternatively, the perimeter validation may provide a visual indication to the user of the mobile device as to the locations in the location data that will be augmented. If all of the locations of the $3^{rd}$ party location data are within the expected location of the venue, the user may accept the $3^{rd}$ party location data, which would then augment the location data of the mobile device.

The retrieved augmented location data may include expiration information indicating how long the $3^{rd}$ party temporal location data is valid for. The location services 606 may include expiration control functionality 608 that checks the expiration information of the retrieved $3^{rd}$ party temporal location data and if the expiration has passed removes the $3^{rd}$ party temporal location data from the location data. The expiration control 608 may periodically check the expiration time of the augmented information or may check the expiration time prior to using the augmented information.

Figure 7:
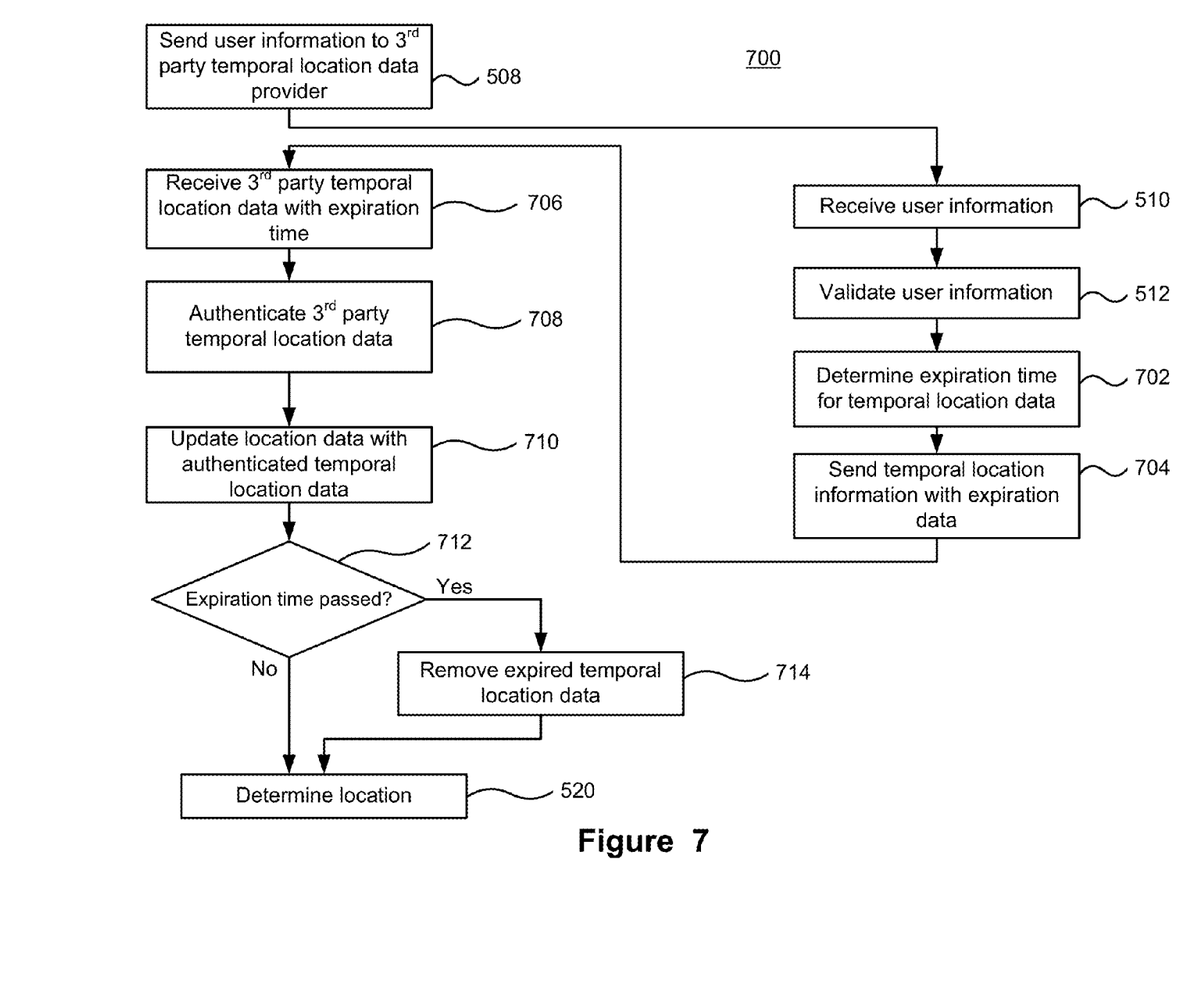
FIG. 7 depicts a further method for augmenting location data at a mobile device.

FIG. 7 depicts a further method for augmenting location data at a mobile device. The method 700 begins similarly to method 500 described above. After determining that $3^{rd}$ party temporal location data is to be retrieved, the method sends user information to a $3^{rd}$ party temporal location data provider (508). The $3^{rd}$ party temporal location data provider receives the user information (510). The user information is validated (512) and a token expiration time for the $3^{rd}$ party temporal location data is determined (702). The token expiration time may be determined based on the $3^{rd}$ party location data provided. Additionally or alternatively, the token expiration time may be based on the user information. Once the token expiration time is determined, the $3^{rd}$ party temporal location data and the token expiration information are sent to the mobile device (704). The $3^{rd}$ party temporal location data and token expiration information is received at the mobile device (706) and the information is authenticated (708). Once the information is authenticated, the $3^{rd}$ party temporal location data is used to augment the location data (710) on the mobile device. The token expiration time of the augmented location data is checked to determine if the time has expired (712) before using the location data to determine the mobile device's location. If the token expiration time has expired (Yes at 712), the expired augmented location data is removed from the mobile device (714) and the mobile device's location determined (520). If the token expiration time has not expired (No at 712), the location is determined using the augmented location data (520).

FIGS. 8 to 10 depict illustrative user interface screens for augmenting and using location data at a mobile device. The example in FIGS. 8 to 10 depicts the use of the augmented location data to provide enhanced conference functionality. In the example, a registered conference attendee may navigate a browser, or conference application, to a conference home webpage 800. Alternatively, the webpage may be presented when logging on to a network, such as Wi-Fi network, to provide user credentials to provide access to the network, such as for example a pay per access network. The webpage 800 may include a plurality of components, including a title or heading 802, main content or image 804, additional side content 806, and a navigation bar 808. It will be appreciated that the layout of the depicted web page is only illustrative. A link on the navigation bar 808 includes a map link 810. When the user clicks on the map link 810, the user is navigated to a map webpage 902 that depicts a layout 904 of the conference location. The map webpage may include an indication that the conference organizer has provided augmented location data. Upon detecting the availability of the $3^{rd}$ party temporal location data the user may be prompted to determine if they wish to download the $3^{rd}$ party temporal location data. Assuming that the user clicks yes, the $3^{rd}$ party temporal location data is retrieved from the network location and used to augment the available location data used by the mobile device's location service. The webpage 800 may then access the mobile device 200 location that is determined in using the augmented information and use the location to provide various location based services. Since the augmented information can provide an improved estimate of the user's location, even while indoors, the map 904 may display the user's current location 1002. Further, the location data may be combined with additional information to provide location based services. For example, the map page may retrieve information on the attendee's schedule and display the location of the attendee's next meeting 1004 as well as directions 1004 for getting there.

The above has described the ability to retrieve $3^{rd}$ party temporal location data from a network location. In addition to the $3^{rd}$ party temporal location data, additional location-related information or metadata associated with the location may be provided by a third party and retrieved by the mobile device in conjunction with the $3^{rd}$ party temporal location data. The additional location-related information or metadata may include location tags for various areas. For example, and continuing with the conference example above, different locations may be given specific names for the conference, such as 'Registration', 'Relaxation Area' or 'The Experience Zone'. Further additional location-related information may include visual data such as improved map tiles or map vector data for use by a mapping engine of the mobile device. Further still location-related metadata may be provided. The location-based metadata may be location information that may be used by mapping algorithms. For example, the location-based metadata may comprise information on the location of walls, hallways and doors that will facilitate determining a navigation route between locations.

As described above, a $3^{rd}$ party can provide access to temporal location data. The $3^{rd}$ party may monetize access to the additional information or it may be provided free of charge as an additional feature. Regardless of how or if the $3^{rd}$ party chooses to monetize the temporal location data, the above provides a means allowing the $3^{rd}$ party to distribute the location data that they have compiled in a manner they desire.

The above has described providing $3^{rd}$ party temporal location data in order to improve location estimates of mobile devices. It will be appreciated that the location estimates may be determined in various ways, and as such the $3^{rd}$ party temporal location data may also be provided in various ways depending on how the location estimates are determined. For example, location estimates may be determined as a weighted centroid of the locations of transceivers that are visible from the mobile device. In order to improve location estimates based on such a centroid technique, the $3^{rd}$ party temporal location data may associate a location of a respective transceiver with the transceiver's unique ID. As such, the mobile device can determine the unique ID's of the visible transceivers, retrieve the locations of the visible transceivers and then determine the location estimate as a weighted centroid of the locations. Alternatively the location estimate of a mobile device may be determined using a fingerprint based technique, which determines a fingerprint of the transceivers that are visible at the mobile device and determines a the closest fingerprint from a set of fingerprints each associated with a location. The fingerprint of the radio scene of visible transceivers may be generated based on the unique IDs of the visible transceivers. For fingerprint based location estimates, the $3^{rd}$ party location data may comprise a plurality of fingerprints, based on the unique ID's of transceivers, each associated with a respective location at which the fingerprint was captured.

Although the description discloses example methods, system and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

What is claimed is:

1. A method of augmenting location data at a mobile device, the method comprising:
   determining that $3^{rd}$ party temporal location data providing physical locations associated with a plurality of communication transmitters is available at a network location, the $3^{rd}$ party temporal location data including information indicating an expiration time for the temporal location data;
   augmenting location data used by a location service of the mobile device with the $3^{rd}$ party temporal location data available at the network location for use in determining an estimate of a position of the mobile device, wherein the mobile device detects one or more of the plurality of communication transmitters;
   periodically determining if the expiration time has passed; and
   removing the $3^{rd}$ party temporal location data from the mobile device if the expiration time has passed.

2. The method of claim 1, wherein augmenting the location data comprises retrieving the $3^{rd}$ party data from the network location and storing the $3^{rd}$ party location data on the mobile device.

3. The method of claim 2, further comprising validating that the retrieved $3^{rd}$ party temporal location data retrieved from the network location was provided by the 3rd party.

4. The method of claim 1, wherein retrieving the $3^{rd}$ party temporal location data comprises:
   sending from the mobile device to the network location user credentials associated with the user;
   verifying, using the user credentials, that the user is authorized to retrieve the $3^{rd}$ party temporal location data; and
   sending the $3^{rd}$ party temporal location data from the network location to the mobile device.

5. The method of claim 1, further comprising validating a perimeter of the retrieved $3^{rd}$ party temporal location data prior to storing the $3^{rd}$ party location data.

6. The method of claim 1, further comprising:
   receiving a location request for determining the location of the mobile device, the location request comprising one or more unique identifiers (IDs) associated with communication transmitters detected by the mobile device, at least one of the unique IDs associated with one of the plurality of communication transmitters included in the $3^{rd}$ party temporal location data;
   retrieving locations of the communication transmitters associated with each of the one or more unique IDs in the request;
   determining the estimate of the location of the mobile device using the retrieved communication transmitter locations.

7. The method of claim 6, wherein the periodically determining if the expiration time has passed is performed prior to retrieving the locations of the communication transmitters associated with each of the one or more unique IDs in the request.

8. The method of claim 7, further comprising:
   determining a length of time the $3^{rd}$ party temporal location data is valid for; and
   sending as the expiration time the determined length of time to the mobile device with the $3^{rd}$ party temporal location data.

9. The method of claim 1, wherein augmenting the location data comprises using a service located at the network location to access the $3^{rd}$ party temporal location data.

10. The method of claim 9, further comprising:
transmitting a query radio scene comprising an indication of one or more communication transceivers to the service located at the network location;
determining a location estimate at the network location based on the radio scene using at least a portion of the $3^{rd}$ party temporal location data; and
receiving the location estimate at the mobile device.

11. The method of claim 1, wherein the $3^{rd}$ party temporal location data comprises one or more of:
locations associated with individual communication transceivers; and
locations associated with fingerprints of one or more communication transceivers visible by a capturing mobile device at the respective location.

12. The method of claim 1, wherein the communication transmitters comprise transceivers configured for Institute of Electrical and Electronic Engineers (IEEE) 802.11 communications.

13. The method of claim 1, further comprising retrieving additional location-related information or metadata associated with the $3^{rd}$ party temporal location data.

14. A mobile device capable of augmenting location data at the mobile device, the mobile device comprising:
a processor for executing instructions; and
a memory for storing instructions, which when executed by the processor configure the mobile device to perform operations comprising:
determining that $3^{rd}$ party temporal location data providing physical locations associated with a plurality of communication transmitters is available at a network location, the $3^{rd}$ party temporal location data including information indicating an expiration time for the temporal location data;
augmenting location data used by a location service of the mobile device with the $3^{rd}$ party temporal location data available at the network location for use in determining an estimate of a position of the mobile device, wherein the mobile device detects one or more of the plurality of communication transmitters;
periodically determining if the expiration time has passed; and
removing the 3rd party temporal location data from the mobile device if the expiration time has passed.

15. The mobile device of claim 14, wherein augmenting the location data comprises retrieving the $3^{rd}$ party data from the network location and storing the $3^{rd}$ party location data on the mobile device.

16. The mobile device of claim 15, wherein the method performed by the mobile device further comprises validating a perimeter of the retrieved $3^{rd}$ party temporal location data prior to storing the $3^{rd}$ party location data.

17. The mobile device of claim 14, wherein retrieving the $3^{rd}$ party temporal location data comprises:
sending from the mobile device to the network location user credentials associated with the user;
verifying, using the user credentials, that the user is authorized to retrieve the $3^{rd}$ party temporal location data; and
sending the $3^{rd}$ party temporal location data from the network location to the mobile device.

18. The mobile device of claim 14, wherein the method performed by the mobile device further comprises:
receiving a location request for determining the location of the mobile device, the location request comprising one or more unique identifiers (IDs) associated with communication transmitters detected by the mobile device, at least one of the unique IDs associated with one of the plurality of communication transmitters included in the $3^{rd}$ party temporal location data;
retrieving locations of the communication transmitters associated with each of the one or more unique IDs in the request;
determining the estimate of the location of the mobile device using the retrieved communication transmitter locations.

19. The mobile device of claim 18, wherein the periodically determining if the expiration time has passed is performed prior to retrieving the locations of the communication transmitters associated with each of the one or more unique IDs in the request.

20. The mobile device of claim 19, further comprising:
determining a length of time the $3^{rd}$ party temporal location data is valid for; and
sending as the expiration time the determined length of time to the mobile device with the $3^{rd}$ party temporal location data.

21. A method of augmenting location data at a mobile device, the method comprising:
determining that 3rd party temporal location data providing physical locations associated with a plurality of communication transmitters is available at a network location, the $3^{rd}$ party temporal location data including information indicating an expiration time for the temporal location data; and
augmenting location data used by a location service of the mobile device with the $3^{rd}$ party temporal location data available at the network location for use in determining an estimate of a position of the mobile device, wherein the mobile device detects one or more of the plurality of communication transmitters, and augmenting the location data comprises using a service located at the network location to access the $3^{rd}$ party temporal location data and the method further comprises:
transmitting a query radio scene comprising an indication of one or more communication transceivers to the service located at the network location;
determining a location estimate at the network location based on the radio scene using at least a portion of the 3rd party temporal location data;
receiving the location estimate at the mobile device;
periodically determining if the expiration time has passed; and
removing the location estimate from the mobile device when the expiration time has passed.

22. The method according to claim 21 wherein the query radio scene comprises:
a list of transmitter IDs visible from the mobile device; and
information on at least one of received signal strength and signal timing for each transmitter in the list of transmitter IDs.

* * * * *